C. RAETZ.
Spinning-Top.

No. 202,118.           Patented April 9, 1878.

UNITED STATES PATENT OFFICE.

CHRISTOPHFER RAETZ, OF SAN FRANCISCO, CALIFORNIA.

IMPROVEMENT IN SPINNING-TOPS.

Specification forming part of Letters Patent No. 202,118, dated April 9, 1878; application filed December 29, 1877.

*To all whom it may concern:*

Be it known that I, CHRISTOPHFER RAETZ, of the city and county of San Francisco, and State of California, have invented a Top; and I do hereby declare the following to be a full, clear, and exact description thereof, reference being had to the accompanying drawings.

My invention relates to certain improvements in spinning-tops and their means of propulsion; and it consists in the use of a novel handle containing a torsional actuating or propelling spring, and an actuating-shaft constructed with a notched end, so that it may be temporarily connected with the corresponding end or stem of the top, together with a trigger, which holds the spring, or releases it, when desired.

Figure 1:
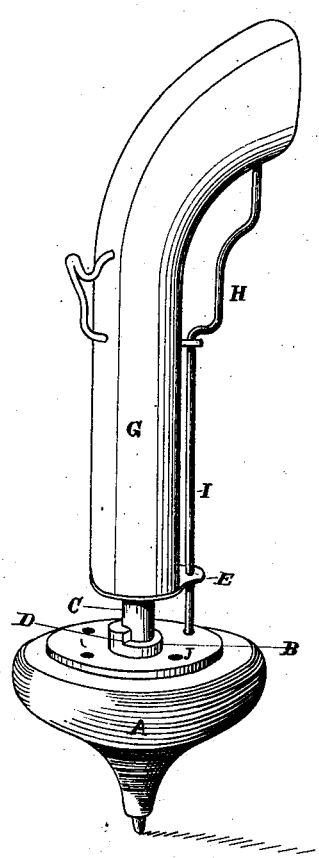
Figure 2:
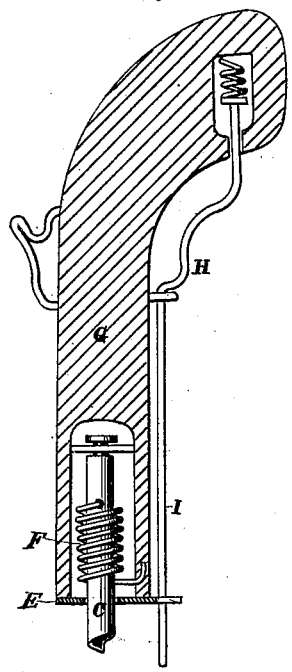

In the accompanying drawings, Figure 1 shows the top and handle connected together. Fig. 2 is a section showing the interior of the handle.

A is a top, having the tubular stem B projecting from its upper end, so as to receive and be steadied by the rotating tube C in the handle. The end of this tube is made spiral, with an offset, so as to fit a corresponding notched projection or clutch, D, upon the top, as shown. The tube C passes out of the handle through a plate, E, and its inner end fits over a pin to form a step, so that it may turn freely.

The spiral spring F, which surrounds the clutch-tube C, has one end secured to the tube by passing through it or otherwise, while the other end is secured to the material of the handle surrounding the tube.

The handle G is made in the form of a pistol, and may have an imitation hammer. Beneath this handle is formed a trigger, H, having the rod or extension I passing out through the plate E below the point where the tube C emerges, and sufficiently far to enter any one of the series of holes J which are made in the top. The rear end of this trigger is formed into or operated by a spring, which tends to force it forward, and when the top is connected the end of the rod I is forced into one of the holes in the top. The operation then will be as follows: The top being placed in the proper position in contact with the tube, the trigger and rod are drawn back, and the top turned around. The clutch-connection causes the tube C to turn until it has wound up the spring, when the trigger is let go, and the rod I will enter one of the holes J, thus securing the top ready to be used. It is started by simply pulling the trigger in the manner of firing a pistol, thus making a novel and pleasing toy.

The top will be disengaged from the clutch by the momentum of the spring, and will thus be caused to spin upon any surface.

Having thus described my invention, what I claim as new, and desire to secure by Letters Patent, is—

The handle G, with its rotating clutch-tube C, spring F, and trigger H I, in combination with the top A, with its stem B, and provided with the clutching-shoulder D, the top having perforations J to receive the rod I and retain the top, or allow it to be released, substantially as herein described.

In witness whereof I hereunto set my hand and seal.

CHRISTOPHFER RAETZ. [L. S.]

Witnesses:
 FRANK A. BROOKS,
 WALLER C. BEATIE.